Sept. 4, 1934.   J. A. SPENCER   1,972,171
RELIEF VALVE
Filed Sept. 8, 1930

John A. Spencer, Inventor.
Delos G. Haynes, Attorney.

Patented Sept. 4, 1934

1,972,171

UNITED STATES PATENT OFFICE 1,972,171

RELIEF VALVE

John A. Spencer, Newtonville, Mass., assignor to General Plate Company, Attleboro, Mass., a corporation of Massachusetts Application September 8, 1930, Serial No. 480,454

1 Claim. (Cl. 277—61)

This invention relates to relief valves, and with regard to certain more specific features, to temperature and pressure relief valves.

Among the several objects of the invention may be noted the provision of a simplified and compact form of valve for pressure-heating systems adapted to relieve against excessive pressure and overheating and/or against subnormal pressures. Other objects will be in part obvious and in part pointed out hereinafter.

The invention accordingly comprises the elements and combinations of elements, features of construction, and arrangements of parts which will be indicated in the following claim.

In the accompanying drawing, in which is illustrated several of various possible embodiments of the invention, Fig. 1 is a cross section showing one form of the invention;

Similar reference characters indicate corresponding parts throughout the several views of the drawing.

Figure 1:
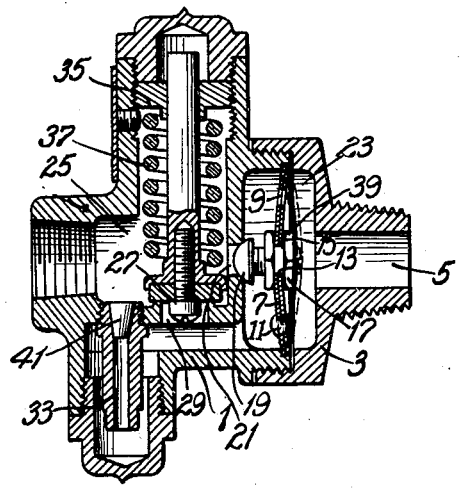
Figure 2:
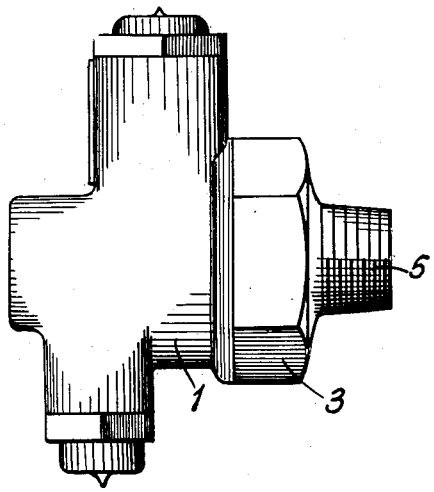
Fig. 2 is a side elevation.

Referring now more particularly to Fig. 1, there is illustrated at numeral 1 a housing to which is attached a cap 3 serving to form an inlet 5 and to support a cupped, composite, thermostatic disc 7. This disc 7 is formed of discs of the general type described in Patent 1,448,240, dated March 13, 1923, and has a non-developable surface. Its function is to move with a snap action from the full-line position to the dotted-line position (Fig. 1) at a predetermined rise in temperature thereof.

The disc 7 has the same action as said discs of Patent 1,448,240. However, it is composed of a plurality of said patented discs in order to obtain increased force of operation. In order to fasten the plurality of patented discs, rivets are used of which the rivet shown at numeral 11 is exemplary. The disc 7 is also provided with openings for permitting passage of fluid, opening 9 being exemplary. At a central opening 13 the disc 7 preferably loosely engages with a groove 15 of a bushing 17 to which bushing 17 is adjustably fastened a valve 19 seating at the inlet end of a passage 21. The passage 21 communicates between an inlet chamber 23 which houses the disc 7 and an outlet chamber 25 which houses a spring pressed pressure relief valve 27, the latter seating at the outlet of a passage 29. The passage 29 provides communication between the outlet chamber 25 and said inlet chamber 23.

Another passage 31, in the form of a nozzle 33 also abnormally provides communication between passages 25 and 23 but is normally closed by a fusible plug 41.

From the above it will be seen that three normally blocked communications are had between the inlet and outlet of the device. The spring pressed valve blocking passage 29 is adjustable (see adjustable shoulder 35 for spring 37) to be set at a desired pressure, say 125 pounds per square inch. The valve 19 may be adjusted to be opened by the thermostatic disc 7 at a desired temperature (see adjusting head 39). The theory of the adjustment is that as the valve 19 is screwed down in its seat, the reaction set up on the disc 7 causes initial stresses and strains to be set up in the disc, thereby causing it to react to temperature change otherwise than if not so stressed and strained, the variation in temperature at which valve opening takes place being a function of said stresses and strains.

The valve 19 should be set to open at a temperature lower than the fusing temperature of the plug 41.

Figure 3:
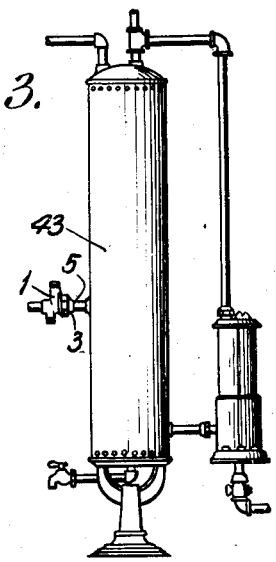
Fig. 3 is a diagram showing an application to a water heating system.

A typical connection is shown in Fig. 3 wherein the inlet 5 is put into direct communication with a heating tank 43, the outlet leading to a suitable discharge point preferably at atmospheric pressure.

Operation is as follows:

The water in tank 43 is heated. Under emergency conditions (for example when a gas heater is left on by mistake), the temperature may rise with or without corresponding increase in pressures or the pressure may rise without substantial temperature rise. At 125 pounds per square inch, if the pressure relief valve were used only, that valve would open. But the pressure relief valve may be functioning perfectly at 125 pounds pressure; nevertheless under certain emergency conditions of heat input the temperature rises without pressure increase. The pressure relief valve does not respond to temperature. With the said pressure and metal softening temperature the tank ordinarily bursts.

By using the temperature relief valve 19, set to a safe temperature the auxiliary outlet 21 is opened, thus permitting escape of water. After the emergency has passed and the temperature recedes with or without the pressure the thermostat 7 returns to close the valve 19, thus automatically shutting off an otherwise damaging flow, and so distinguishing from fusible plug temperature reliefs per se.

If the combined areas of the outlets 21 and 29 is not great enough, the pressure and temperature will rise further to the point at which the fusible plug 41 will relieve, thus providing more area without increase in spring size. The fusing point of the plug 41 is higher than that at which the thermostat operates.

Another advantage of the invention is that the thermostatic valve 19 will open under a subatmospheric pressure in the tank 43, such as when an abnormally heavy draft is made on its water supply. Tanks using only one-way pressure relief valves and/or fusible plugs cannot be relieved under such conditions and have been known to collapse.

Figure 4:
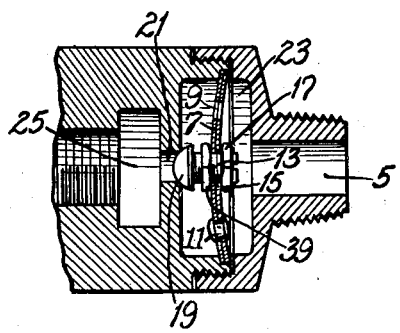
Fig. 4 is a cross section showing a modification.

It is to be understood that the invention includes use of the thermostatically controlled valve 19 alone (Fig. 4), or with a pressure valve eliminating the third relief in the form of the plug 41.

Another feature to be noted is that the thermostat 7 opens the valve 19 against pressure at the inlet. The snap-acting thermostat, such as here disclosed provides a more successful and sure opening under these conditions than will others.

Substitution for the openings 9 may be made by by-passing the disc 7 with a suitable passage.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

A safety relief device comprising a casing having a chamber in open communication with a fluid supply and having waste outlet ports for discharging the fluid from the chamber, a pressure relief valve normally closing one of said waste ports against the outflow of fluid but yieldable only under excess pressure to allow the outflow of fluid from the chamber, a second valve normally seated under pressure of fluid in said chamber to close the other port, and temperature-responsive means for unseating the latter valve and keeping it open while the temperature of the fluid in the casing is in excess of a predetermined temperature.

JOHN A. SPENCER.